(12) United States Patent
Yared et al.

(10) Patent No.: US 11,360,962 B2
(45) Date of Patent: *Jun. 14, 2022

(54) DETECTING AND REPORTING CHANGES IN DATA VALUES

(71) Applicant: Citrix Systems, Inc., Fort Lauderdale, FL (US)

(72) Inventors: Peter Yared, San Francisco, CA (US); Jan Surovec, Prague (CZ); Tomas Kmec, Prague (CZ); Simon Macharecek, Prague (CZ)

(73) Assignee: Citrix Systems, Inc., Fort Lauderdale, FL (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/929,846

(22) Filed: Jul. 15, 2020

(65) Prior Publication Data

US 2020/0349144 A1    Nov. 5, 2020

Related U.S. Application Data

(63) Continuation of application No. 15/728,333, filed on Oct. 9, 2017, now Pat. No. 10,733,173.

(51) Int. Cl.
  *G06F 16/00* (2019.01)
  *G06F 16/23* (2019.01)
  *G06F 16/2457* (2019.01)

(52) U.S. Cl.
  CPC ...... *G06F 16/2358* (2019.01); *G06F 16/2379* (2019.01); *G06F 16/24575* (2019.01)

(58) Field of Classification Search
  CPC ............. G06F 16/2358; G06F 16/2379; G06F 16/24575

USPC .......................................................... 707/722
  See application file for complete search history.

(56) References Cited

U.S. PATENT DOCUMENTS

| 7,318,066 | B2 * | 1/2008 | Kaufman | .............. G06F 16/252 |
| 8,812,558 | B1 | 8/2014 | Qian | |
| 8,914,404 | B1 | 12/2014 | Kim et al. | |
| 9,690,820 | B1 | 6/2017 | Girulat, Jr. | |
| 10,733,173 | B2 * | 8/2020 | Yared | .................. G06F 16/2358 |
| 2004/0225612 | A1 * | 11/2004 | Shimojima | ...... G11B 20/00195 |
| | | | | 705/57 |

(Continued)

OTHER PUBLICATIONS

Non-Final Office Action on U.S. Appl. No. 15/728,333, dated Dec. 2, 2019.

(Continued)

*Primary Examiner* — Thanh-Ha Dang
(74) *Attorney, Agent, or Firm* — Foley & Lardner LLP

(57) ABSTRACT

A monitoring module interfaces with existing non-retrospective data storage systems, thus providing mechanisms for detecting and reporting changes in data values stored in such systems. The monitoring module acts as a change detection layer that can operate in connection with multiple disparate systems and/or locations, so as to provide users with a unified view into data stored in such systems. For example, a user can consult a single app, website, or software application, to view changes for data values stored in multiple disparate systems and/or locations; the app can be configured to automatically generate notifications and alerts to users, and can provide the ability to respond to such notifications and alerts, take actions, and/or dive deeper into underlying data.

20 Claims, 12 Drawing Sheets

(56) References Cited

U.S. PATENT DOCUMENTS

| | | |
|---|---|---|
| 2005/0038791 A1 | 2/2005 | Ven |
| 2006/0069753 A1 | 3/2006 | Hu et al. |
| 2006/0075001 A1 | 4/2006 | Canning et al. |
| 2006/0130037 A1 | 6/2006 | Mackay |
| 2008/0270831 A1* | 10/2008 | Niwa .................... G06F 11/141 714/15 |
| 2010/0217945 A1* | 8/2010 | Ge .......................... G06F 9/384 711/156 |
| 2011/0269424 A1* | 11/2011 | Multer ................ H04L 67/1095 455/411 |
| 2012/0233123 A1 | 9/2012 | Shisheng et al. |
| 2013/0316744 A1 | 11/2013 | Newham et al. |
| 2014/0358853 A1* | 12/2014 | Sagar ...................... G06F 16/27 707/610 |
| 2015/0188799 A1* | 7/2015 | Keskitalo ................ H04L 67/26 709/203 |
| 2016/0239387 A1 | 8/2016 | Fu et al. |
| 2016/0253372 A1 | 9/2016 | Nguyen et al. |
| 2016/0299933 A1 | 10/2016 | Fillipi et al. |
| 2016/0330279 A1 | 11/2016 | Patel et al. |
| 2017/0243197 A1 | 8/2017 | Salvador |
| 2018/0309646 A1* | 10/2018 | Mustafiz ............. H04L 41/5041 |

OTHER PUBLICATIONS

Notice of Allowance on U.S. Appl. No. 15/728,333, dated Mar. 25, 2020.

* cited by examiner

DETECTING AND REPORTING CHANGES IN DATA VALUES

CROSS-REFERENCE TO RELATED PATENT APPLICATIONS

This application is a continuation of and claims priority to and the benefit of U.S. patent application Ser. No. 15/728,333, titled "DETECTING AND REPORTING CHANGES IN DATA VALUES," and filed on Oct. 9, 2017, the contents of all of which are hereby incorporated herein by reference in its entirety for all purposes.

TECHNICAL FIELD

The present document relates to mechanisms for automatically detecting changes to stored data in a variety of external systems, and for automatically notifying users of such changes based on pre-specified criteria and per-user customization.

BACKGROUND

Existing enterprise systems store many different types of data concerning various operations of a business. Users, such as employees and management, are often interested in being notified as to changes in certain data values. However, many systems are non-retrospective, in that they do not automatically store historical data; therefore, such systems are not able to compare current data values with previous values, so as to detect and measure changes over time.

In addition, existing techniques generally fail to provide any mechanism for detecting and reporting changes in data that is stored across a variety of disparate systems. In order to view data stored in different systems and locations, a user typically must log onto these various systems and access each data item separately.

Furthermore, such systems are not generally well-equipped to automatically notify users of changes on modern endpoints such as mobile push notifications and instant messengers.

Furthermore, due to the non-retrospective nature of many enterprise systems, the context of changed data is typically not present, such as an indication of a previous value, and by how much or by what percentage it has changed.

SUMMARY

Various embodiments of the present disclosure provide techniques for providing a monitoring module that interfaces with existing non-retrospective systems, thus providing mechanisms for detecting and reporting changes in data values stored in such systems. In at least one embodiment, the monitoring module acts as a change detection layer that can operate in connection with multiple disparate systems and/or locations, so as to provide users with a unified view into data stored in such systems. For example, a user can consult a single app, website, or software application, to view changes for data values stored in multiple disparate systems and/or locations; the app can be configured to automatically generate notifications and alerts to users, and can provide the ability to respond to such notifications and alerts, take actions, and dive deeper into underlying data.

In at least one embodiment, a user can define a notification condition, or such notification condition can be automatically generated, that will cause the user to be alerted when data values in records change. In this manner, the user can be automatically notified of records when certain conditions occur, for example if a data value in a record changes by a certain amount, or if a data value becomes less than, greater than, or equal to some specified amount.

In at least one embodiment, the system polls, at a preset interval, for changes in stored data that users are likely to be interested in. Determinations as to which changes may be of interest to particular users can be made automatically, for example by observing the user's historical data viewing patterns, and/or by observing patterns of other users with similar interests, positions, or access parameters.

By comparing previously stored data against new data, the system can detect changes. When a change to stored data takes place, the system can generate notifications as appropriate. In at least one embodiment, users can be notified only when changes are of at least a certain magnitude, or percentage, and/or when such changes take place to data items of interest. Such parameters can be specified by administrators and/or users, and can be uniform for all users or personalized by user.

In at least one embodiment, the system generates alerts to those users who are likely to find the change in data interesting or significant. This can be determined based on explicitly specified preferences (i.e., users subscribing to be notified of changes to certain data items), or by inference based on detected user behavior, position within the company, authentication levels, and/or the like. Any suitable channel can be used for notifying users, including for example, push notifications, text messages, instant messages, voice calls, email messages, in-app notifications, and/or the like.

For example, a user of a customer relationship management (CRM) product may be primarily interested in new sales opportunities and changed sales opportunities. Accordingly, the described system can periodically copy a subset of the data representing data items likely to be of interest to the user, and can poll for changes in the data. When a change to a data item in the subset is detected, the old and new values are stored in the system's database, and those parties interested in that data item (such as the user) can be automatically notified. By maintaining a copy of data values of interest, the system is able to detect changes even in those systems that are non-retrospective and cannot otherwise detect changes to data values. By making determinations as to which data items are likely to be of interest, the system keeps the total data storage requirements at a reasonable level.

In at least one embodiment, the system generates hash values for data items. This facilitates quick detection of changes in data, by periodically generating new hash values for some subset of data items, and comparing these hash values with previously stored hash values for the same subset of data items. If a change is detected, the system can then look at the data underlying the hash value to determine, with specificity, which data item has changed.

Any suitable polling interval can be used for periodically storing data and/or hash values. For example, in at least one embodiment, such data is stored on a daily basis. However, different intervals can be used for different data and/or hash values, based on needs and constraints. Depending on load of the hosting system, data can be queried continuously for near-realtime detection of data changes.

Any suitable expiry period can be established, after which stored data is automatically deleted. For example, in one embodiment, stored data is deleted after 90 days. Alternatively, data can be kept indefinitely. In at least one embodiment, the system stores the latest value for a data item indefinitely, and discards previous values after some period of time.

As mentioned above, any suitable notification mechanism can be used for notifying users as to changes in data. The notification mechanism can be independent of whatever native notification system may exist in the underlying system(s). In this manner, for example, the described system allows a push notification paradigm to be overlaid on a legacy system that does not otherwise provide for push notifications. The system detects changes by periodically polling data, and generates push notifications to users in response to changes as described herein.

The described system thus provides a mechanism by which users can use a single application to be notified of changes to relevant data across multiple underlying systems and databases, based on what the individual users are most interested in. In at least one embodiment, the system also provides functionality for mapping the user's identity across multiple platforms, obviating the need for the user to sign in separately for each individual system.

In at least one embodiment, a graph algorithm of similar users based on usage and security group membership can be used to recommend data changes amongst users with similar consumption patterns.

In at least one embodiment, if a data change requires action amongst a group of users, if a particular user "claims" the data change, the notification for other users can be automatically removed.

In at least one embodiment, if a data change requires the user to write-back to the origin system, such a write-back can be performed with an immediate check to determine if data has changed in the interim.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

In at least one embodiment, the system and method described provide mechanisms for monitoring data values in non-retrospective systems, detecting changes in such data values, and automatically notifying users of such changes. In various embodiments, the described system and method also provide mechanisms for configuring the monitoring and notification components so that users receive notifications for those changes that are of interest to them.
System Architecture According to various embodiments, the system can be implemented on any electronic device or set of interconnected electronic devices, each equipped to receive, store, and present information. Each electronic device may be, for example, a server, a desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet.

However, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Figure 1:
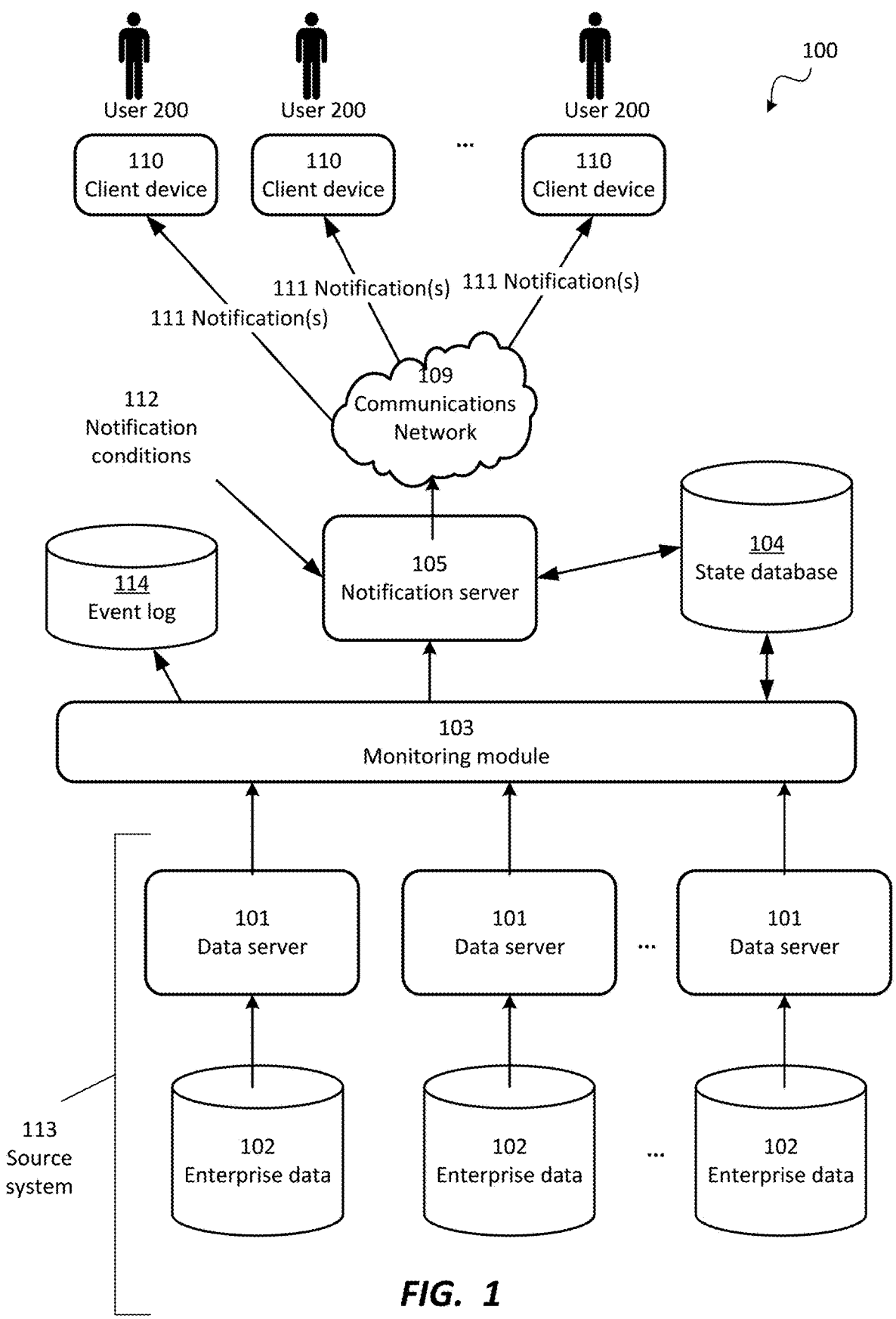
FIG. 1 is a block diagram depicting an architecture for a system for detecting and reporting changes in data values to a user, according to one embodiment.

Referring now to FIG. 1, there is shown a block diagram depicting an architecture for a system 100 for detecting and reporting changes in data values to a user, according to one embodiment. Source system 113, which may be any enterprise system for storing data relating to a company or other entity, includes any number of data servers 101, each capable of communicating with an enterprise data store 102 and obtaining and/or extracting information from such data stores 102, including data values.

Data stored in data store(s) 102 may include one or more pieces of data, each of which may be of any desired length and format. Each piece of data may be a character string, integer, floating point number, or any other type of data, and may represent any information such as names, times, dates, currency amounts, percentages, fractions, physical dimensions, or any other data that may desirably be stored in an electronic storage device. In at least one embodiment, data store 102 stores data relevant to operation of an enterprise such as a company, organization, or other entity.

As described in more detail below, monitoring module 103 periodically monitors data values stored in data stores 102, and stores historical data in state database 104. When module 103 detects changes in stored data, a determination is made as to whether such changes warrant notification; this determination can be made using any suitable notification conditions 112. When a notification is warranted, notification server 105 transmits such notification(s) 111 to client device(s) 110, via communications network 109 such as the Internet. Event log database 114 can also be provided, for keeping track of all changes that have taken place to relevant data in source system 113. Event log database 114 can store time-stamped records indicating specific changes to fields and records in any of data store(s) 102. Any suitable data structure(s) can be used for storing such data in database 114. Event log database 114 can be provided using any suitable data storage hardware, which may be the same storage device used to store state database 104, or a different storage device. In an alternative embodiment, event log database 114 can be omitted.

Notification server 105 and monitoring module 103 can be implemented on any suitable electronic devices, such as computing devices. Such devices can include, for example, a processor, memory, internal and/or external data store, input and/or output devices, and communications module for facilitating communications with other components of system 100.

State database 104 and/or event log 114 can be implemented as any hardware device (or combination of devices) for storing and organizing digital data. In at least one embodiment, state database 104 and/or event log 114 can be implemented using any known database technology, including for example a RAID (redundant array of independent disks) or other data storage virtualization technology for reliable storage of information. Data stored in database 104 and/or event log 114 can be made available to other components via well known query processes and/or other communications methods.

Any suitable type of communications network 109, such as the Internet, can be used as the mechanism for transmitting data between notification server 105 and client devices 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/ Internet Protocol (TCP/IP), and/or the like, and/or any combination thereof. In at least one embodiment, notification server transmits notifications 111 via a push technology; alternatively, client devices 110 can transmit periodic data requests via communications network 109 (i.e., polling), and notification server 105 can transmit notifications 111 in response to such requests.

FIG. 1 depicts an embodiment wherein the described techniques are implemented in a client/server environment. Such an implementation may use a "black box" approach, wherein data storage and processing are done completely independently from user input/output. An example of such a client/server environment is a web-based implementation, wherein each client device 110 runs a browser that provides a user interface for interacting with web pages and/or other web-based resources from notification server 105. Notifications 111 originating from monitoring module 103 can be presented as part of such web pages and/or other web-based resources, using known protocols and languages such as Hypertext Markup Language (HTML), Java, JavaScript, and the like. Alternatively, client device 110 can run a software application, or app, that presents such notifications 111.

Figure 2:
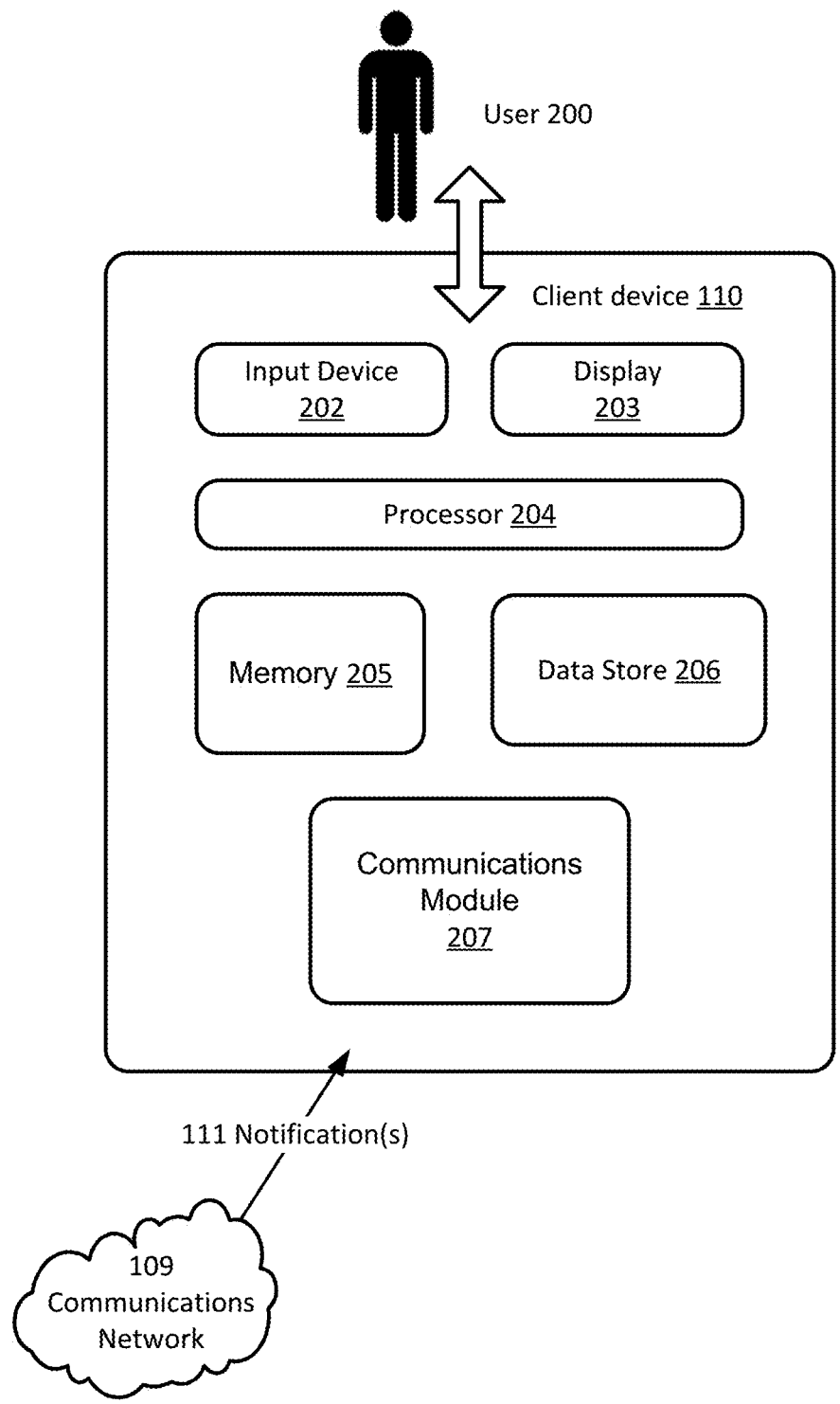
FIG. 2 is a block diagram depicting a hardware architecture for a client device that can be used in connection with the architecture depicted in FIG. 1, according to one embodiment.

Referring now to FIG. 2, there is shown a block diagram depicting a hardware architecture for a client device 110 that can be used in connection with the architecture depicted in FIG. 1, according to one embodiment. Client device 110 may be any electronic device equipped to receive, store, and/or present information, and to receive user input in connection with such information. Client device 110 can be, for example, a desktop computer, laptop computer, personal digital assistant (PDA), cellular telephone, smartphone, music player, handheld computer, tablet computer, kiosk, game system, or the like.

In at least one embodiment, client device 110 has a number of hardware components well known to those skilled in the art. Input device 202 can be any element that receives input from user 200, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. Each user 200 can be, for example, an end user or a system administrator.

Data store 206 can be any magnetic, optical, or electronic storage device for data in digital form; examples include flash memory, magnetic hard drive, CD-ROM, DVD-ROM, or the like.

Display 203 can be any element that graphically displays information such as notifications 111, representations of data 102, user interface elements, and/or the like. Such output may include, for example, raw data, data visualizations, navigational elements, queries requesting confirmation and/ or parameters for information identification, display, or presentation, and/or the like. In at least one embodiment where only some of the desired output is presented at a time, a dynamic control, such as a scrolling mechanism, may be available via input device 202 to change which information is currently displayed, and/or to alter the manner in which the information is displayed.

In at least one embodiment, the information displayed on display 203 may include data in text and/or graphical form, and can include various controls and elements for interacting with the displayed data, for example to dismiss alerts, follow links, forward alerts, investigate further, and/or perform other actions.

Processor 204 can be a conventional microprocessor for performing operations on data under the direction of software, according to well-known techniques. Memory 205 can be random-access memory, having a structure and architecture as are known in the art, for use by processor 204 in the course of running software.

Data store 206 can be local or remote with respect to the other components of client device 110. Communications module 207 provides functionality for communicating other components of the system, via a communications network 109 such as the Internet, for example to receive notifications 111 and/or perform other operations. Such communication between client device 110 and other components can take place wirelessly, by Ethernet connection, via a computing network such as the Internet, via a cellular network, or by any other appropriate means.

In at least one embodiment, data store 206 is detachable in the form of a CD-ROM, DVD, flash drive, USB hard drive, or the like. In another embodiment, data store 206 is fixed within client device 110.

In one embodiment, the system can be implemented as software written in any suitable computer programming language, whether in a standalone or client/server architecture. Alternatively, it may be implemented and/or embedded in hardware.

Method

Figure 3:
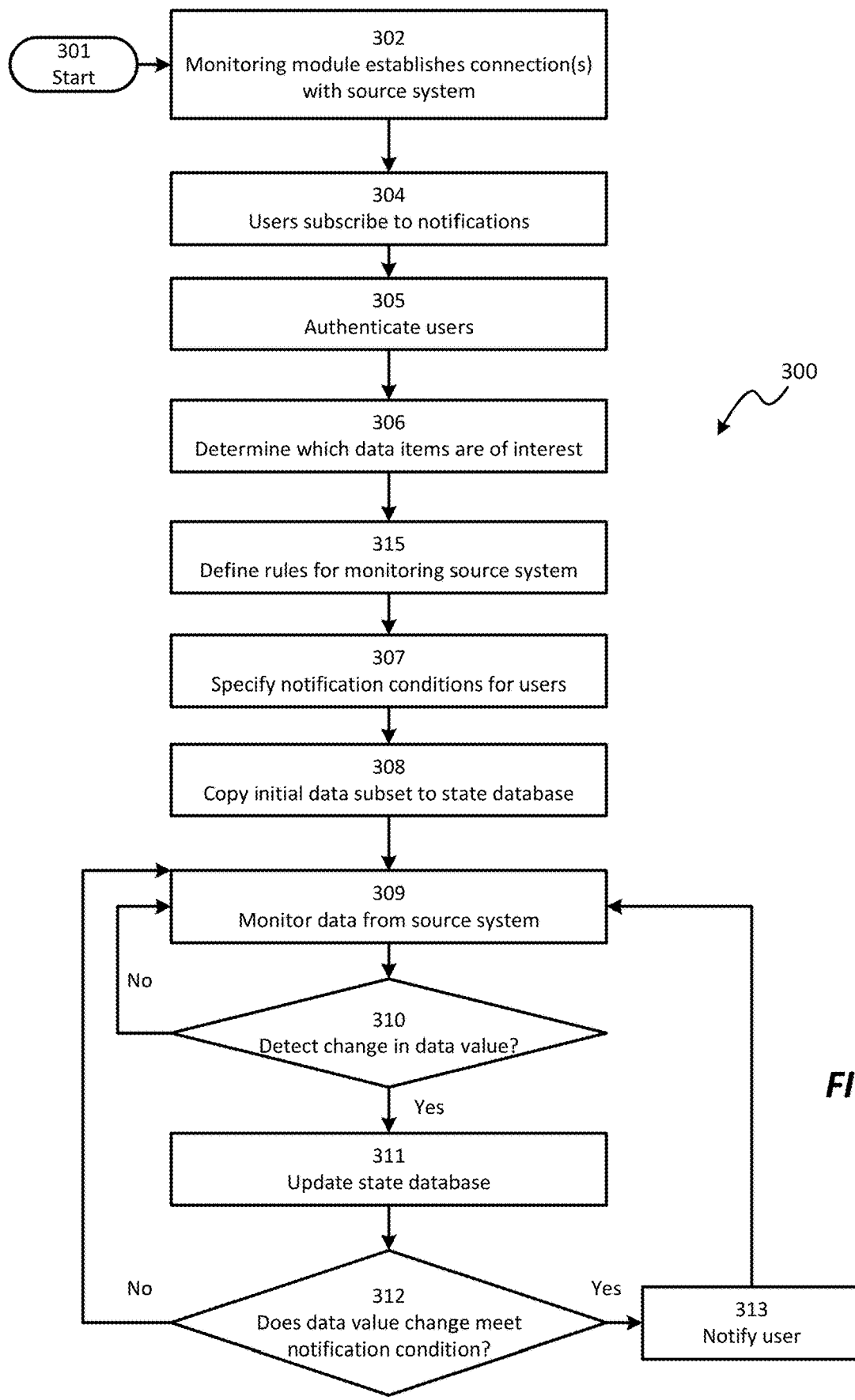
FIG. 3 is a flow diagram depicting a method for detecting and reporting changes in data values to a user, according to one embodiment.

Referring now to FIG. 3, there is shown a flow diagram depicting a method for detecting and reporting changes in data values to a user, according to one embodiment. In at least one embodiment, the method depicted in FIG. 3 can be implemented using architectures such as those depicted in FIGS. 1 and 2; however, one skilled in the art will recognize that other architectures can be used.

The method begins 301. Monitoring module 103 establishes 302 connection(s) with source system 113, which may include enterprise data source(s) such as data server(s) 101 that in turn access enterprise data store(s) 102. Such connection(s) allow monitoring module 103 to retrieve data from data store(s) 102 (for example, by making requests from data server(s) 101) periodically and in accordance with the techniques described herein. Connection(s) can be established using any known protocol and mechanism for communicating data among electronic components. Examples include native proprietary APIs such as Java Connector to SAP BAPI, and/or Web service APIs such as JSON and SOAP.

Users 200 can subscribe 304 to notifications, so as to indicate the type of notifications they would like to receive. In at least one embodiment, this can take place based on input from user(s) 200 specifying what data they are interested in, and what kind of notifications they prefer; alternatively, the system can automatically determine what data and/or notifications a user 200 would likely be interested in, based on their past behavior, their position in an organization, their authentication level, and/or any other suitable available information. Alternatively, an administrator, supervisor, or other entity can make the determination as to what data is likely to be of interest to a particular user 200 and what kind of notifications that user 200 should receive.

In at least one embodiment, the notifications relate to changes in underlying data. Thus, as described in more detail below, monitoring module 103 detects changes in data stored in data store(s) 102, and, when appropriate, initiates notifications to be sent to user(s) 200 in response to such changes.

In at least one embodiment, users 200 are authenticated 305 as needed. For example, in some systems, access to data stored in data stores 102 may be restricted to certain authorized users 200. Any suitable technique, or combination of techniques, can be used for performing such authentication 305, including well known techniques such as password authentication and/or biometric authentication. Authentication 305 can be performed as frequently as is appropriate given the sensitivity of the stored data and/or other contextual factors. Authentication 305 can be performed by monitoring module 103 or by any other component of system 100, or by an external component. Alternatively, authentication 305 can be omitted, if desired.

A determination is made 306 as to which data items are of interest to each user 200. This may be based on subscription information obtained in step 304, or it may be based on any other suitable and available information. For example, users 200 can explicitly specify which data items are of interest, or such determination can be made automatically based on the user's behavior, position within the company, and/or the like.

Based on the determination 306 as to which data items are of interest to each user 200, rules are defined 315 for monitoring source system 113. As described in more detail below, step 315 can include identifying specific records and/or fields to be monitored, and specifying a data polling interval.

Notification conditions 112 are specified 307 for each user 200. Such conditions specify, for example, a threshold change level for initiating and transmitting a notification 111 (alert) to a user 200, or to a client device 110 associated with a user 200. Notification conditions can be specified 307 based on user input, or can be specified automatically based on the user's behavior, position within the company, and/or the like.

As an example of automatic configuration, the system may automatically configure notifications for a regional sales manager, based on his or her position within the company. Based on the knowledge that the regional sales manager is responsible for a particular geographic area, the system may infer that this user 200 is interested in sales data for that geographic area, and may therefore automatically configure monitoring module 103 to alert this user 200 when sales figures for that area change by at least x %, where x may be a predefined constant or may be specified by an administrator, supervisor, or the sales manager him- or herself. In at least one embodiment, such automatic configuration can take place based on user input indicating the position of user 200 within the organization (i.e., sales manager), and may be updated if that position changes, or if the user 200 or some other individual overrides the originally determined configuration. Of course, this example is simplified for illustrative purposes; in various embodiments, the system can be configured to provide various users 200 with any suitable combination of notifications based on the type of information each user 200 is likely to be interested in, and how critical it is that each user 200 be notified of changes in data of various magnitudes.

Initial data is copied 308 to state database 104. In at least one embodiment, state database 104 stores historical data, so that monitoring module 103 can later detect changes in data values even if data store(s) 102 themselves are non-retrospective (i.e., do not themselves store historical data). By periodically comparing data stored in data store(s) 102 with historical data stored in state database 104, monitoring module 103 is able to detect changes in data values and determine whether such changes are of sufficient magnitude to trigger notification(s) 111 to user(s) 200. In at least one embodiment, copying 308 initial data includes storing all current data from data store(s) 102. Alternatively, system 100 can determine a subset of data to copy to state database 104, for example based on which data items are of interest (or are likely to be of interest) to user(s) 200; once such a determination is made, only that subset of data need be copied to state database 104, thus saving bandwidth and storage space.

In at least one embodiment, an expiry period can be specified for data copied to state database 104, so that such data is deleted after the expiry period. For example, the system can be configured to delete data from state database 104 after 90 days, or some other suitable period of time.

In at least one embodiment, only the most recent change to data values is stored in state database 104. Subsequent changes to a data element overwrite earlier changes to the same data element. Alternatively, all changes can be stored, either in event log 114 or in state database 104 itself.

Monitoring module 103 then begins monitoring 309 data from source system 113. Monitoring can be done by periodically polling data server(s) 101, which in turn access data store(s) 102 and provide updated values for data records. Alternatively, a push architecture can be implemented whereby monitoring module 103 is automatically notified of changes to data stored in data store(s) 102. In at least one embodiment, push notifications of such data changes can be sent to monitoring module 103 in response to any change in stored data; alternatively, such notifications can be sent only if a change likely to be of interest to at least one user 200 is detected. In at least one embodiment, a polling interval can be established, specifying the frequency with which monitoring module 103 executes the loop that includes steps 309 through 313.

If monitoring module 103 detects 310 a change in value for a data item stored in data store(s) 102, it updates 311 state database 104. It then makes a determination 312 as to whether the magnitude or degree of the change is sufficient to warrant notifying one or more user(s) 200. If so, it initiates 313 a notification 111 to those client device(s) 110 associated with user(s) 200 who should be notified. In at least one embodiment, determination 312 is made based on notification conditions 112 for each user 200, as specified in step 307. In at least one embodiment, notifications 111 are sent via notification server 105, and can take any suitable form, including push notifications and/or pull notifications. Notifications 111 can be sent via any communications channel(s), including for example alerts within a software application, text messages, email messages, voice calls, and/or any combination thereof. Once monitoring module 103 has initiated 313 the notification 111, monitoring module 103 returns to step 309 to continue monitoring and copying data.

In at least one embodiment, a consolidated notification 111 can be provided that indicates, in a consistent presentation, data changes that have taken place in multiple systems and/or from multiple sources. Notifications 111 can be presented consistently even if they are triggered by data from disparate sources.

If, in step 310, no change in data value is detected, monitoring module 103 returns to step 309 to continue monitoring data from source system 113.

If, in step 312, the change in data value is insufficient to meet a notification condition, monitoring module 103 returns to step 309 to continue monitoring data from source system 113.

In at least one embodiment, as part of step 308, monitoring module 103 (or some other component) also generates and stores, in state database 104, hash values for data items retrieved from source system 113. Subsequently, as part of step 309, changes can be detected by periodically generating new hash values for data items retrieved from source system 113, and comparing such new hash values with hash values previously stored in state database 104. This facilitates quick detection of changes in data of source system 113. If a change in the hash value is detected, monitoring module 103 then examines and compares stored data values in state database 104 against data in source system 113, to determine, with specificity, which data item (or items) has changed.

Figure 7:
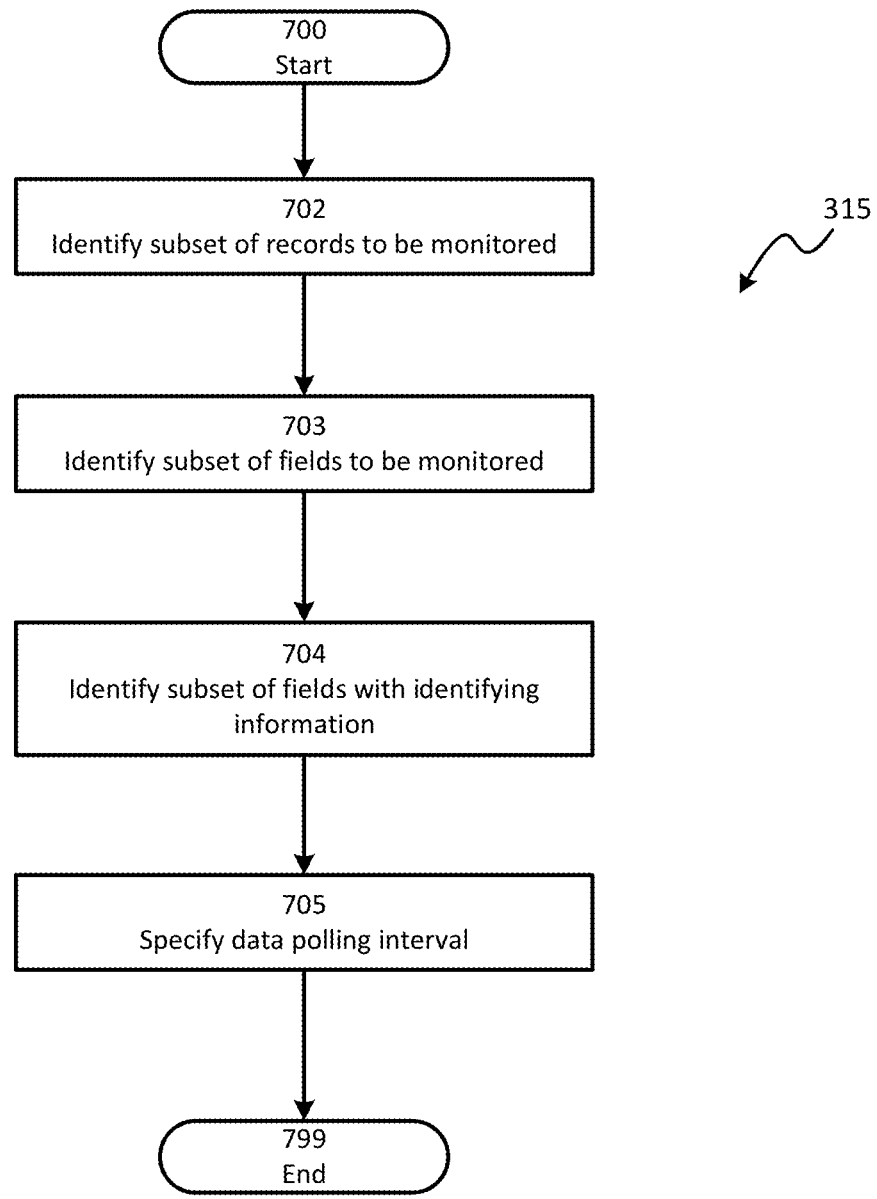
FIG. 7 is a flow diagram depicting a method for defining rules for monitoring a source system, according to one embodiment.

Referring now to FIG. 7, there is shown a flow diagram depicting a method for defining 315 rules for monitoring a source system, according to one embodiment. In at least one embodiment, the method depicted in FIG. 7 can be performed by monitoring module 103 in system 100 as depicted in FIG. 1; alternatively, it can be performed by other components in system 100 or using architectures other than that depicted in FIG. 1.

A subset of records in data store(s) 102 is identified 702 for monitoring. Any suitable subset of records can be identified 702, and the identification can be based on any relevant factor or combination of factors. In at least one embodiment, records are identified 702 for monitoring based on which information is likely to be of interest to user(s) 200. Other factors can also be considered, such as for example the availability or accessibility of particular records, the sensitivity of the data stored therein, and/or the like. In an alternative embodiment, all records in data store(s) 102 can be identified 702 for monitoring.

In addition to identifying 702 specific records to be monitored, in at least one embodiment the monitored data can be specified at a finer level of granularity. For example, specific fields within the records can be identified 703 for monitoring; thus, the system can monitor those specific fields without necessarily monitoring entire records. If appropriate, fields having identifying information are also identified 704, so that the correct data records and fields can be properly monitored. In at least one embodiment, the system can automatically infer what fields to monitor, based on detected events and/or user preferences. For example, the system can determine that, if a user indicates that he or she wants to be notified of all invoices exceeding $50 k within a region, the system determines that the data to be tracked include invoice amount and region.

In at least one embodiment, a data polling interval can be specified 705, either automatically or manually. The data polling interval indicates how frequently monitoring module 103 checks for changed values in data store(s) 102. In at least one embodiment, monitoring module 103 can check for changed values continuously, so that, once a query for changed data is complete, another query is initiated. In at least one embodiment, multiple simultaneous queries are avoided or limited, so that system load does not unduly increase beyond acceptable limits.

Figure 8:
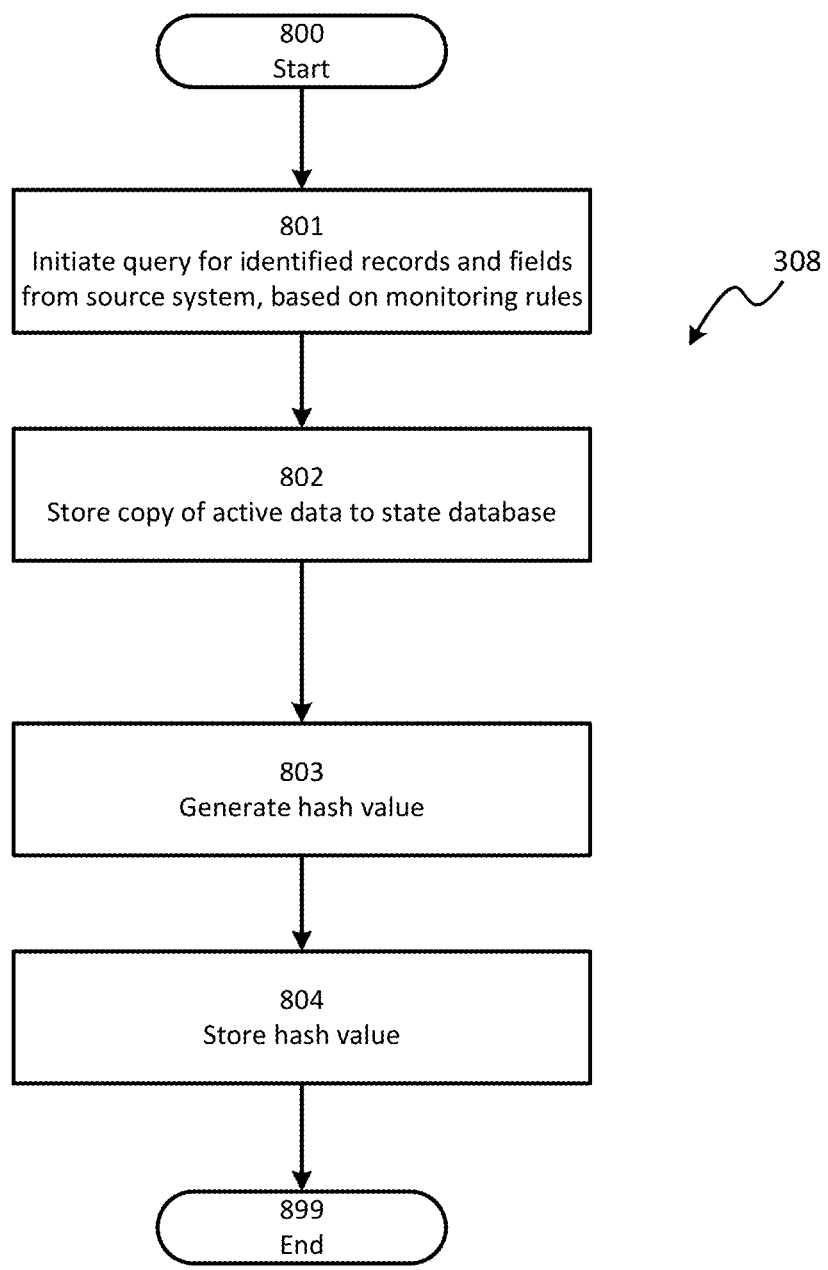
FIG. 8 is a flow diagram depicting a method for copying an initial data subset to a state database, according to one embodiment.

Referring now to FIG. 8, there is shown a flow diagram depicting a method for copying 308 an initial data subset from source system 113 to state database 104, according to one embodiment. Monitoring module 103 initiates 801 a query to source system 113 for those records and fields identified in step 315. Data server(s) 101 of source system 113 obtain the requested data and retrieve it from data store(s) 102. Upon receiving the data from source system 113, monitoring module 103 stores 802 a copy of the data (referred to as "active data") to state database 104. Storing the data in state database 104 in this manner enables detection of subsequent changes to data in data store(s) 102 by comparing stored active data in state database 104 with data from source system 113.

As described in more detail below, a hash of the data from source system 113 can also be stored in state database 104. Accordingly, step 308 can also include generating 803 a hash value for the data retrieved from data store(s) 102, and storing 804 such hash value, either in state database 104 or elsewhere. Steps 803 and 804 are optional and can be omitted.

Figure 9:
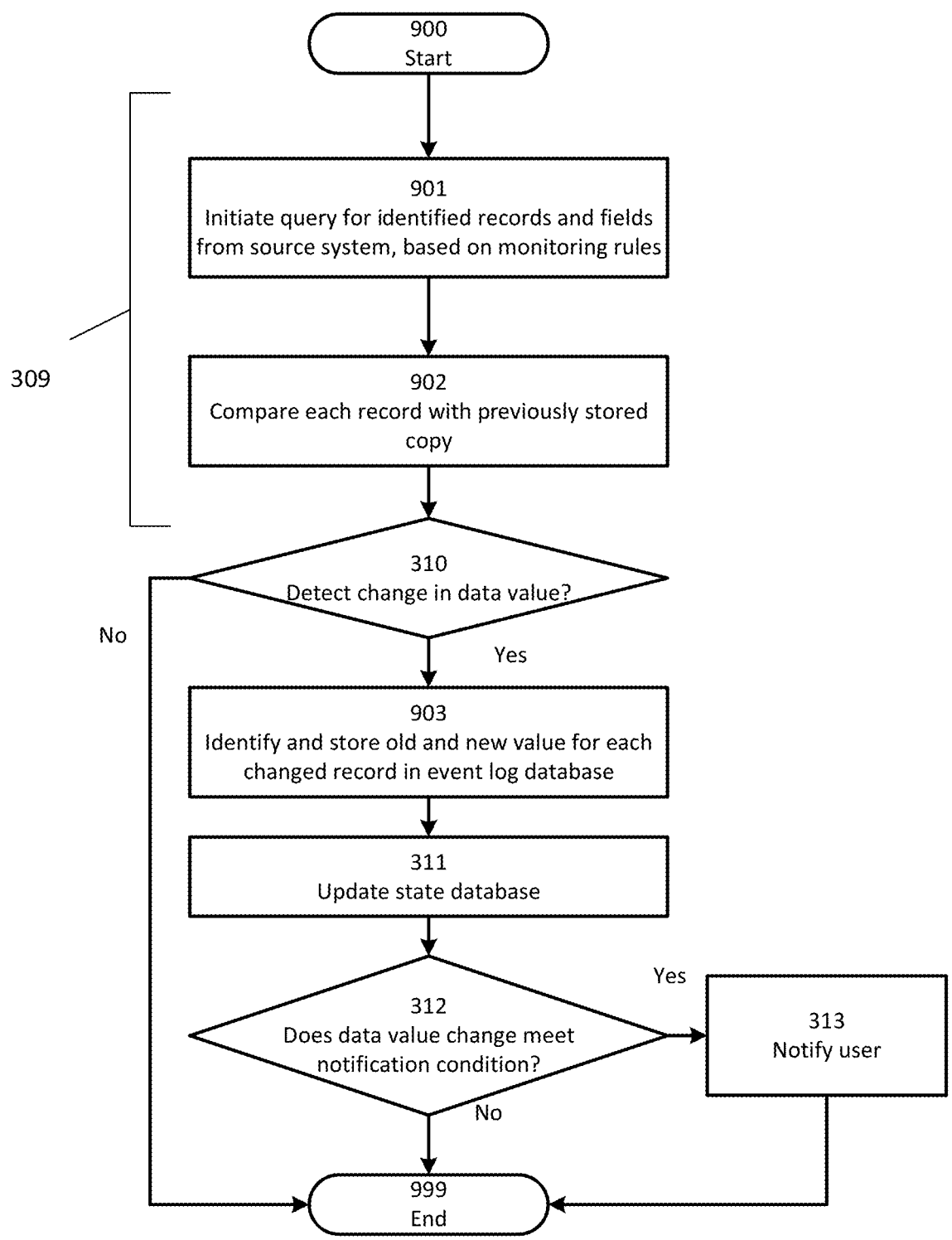
FIG. 9 is a flow diagram depicting a method for detecting and handling changes to data in source system, according to one embodiment.

Referring now to FIG. 9, there is shown a flow diagram depicting a method for detecting and handling changes to data in source system, according to one embodiment. The diagram of FIG. 9 provides more details for the loop that includes steps 309 through 313 of FIG. 3.

Monitoring module 103 initiates 901 a query to source system 113 for those records and fields previously identified in step 315. Data server(s) 101 of source system 113 obtain the requested data and retrieve it from data store(s) 102. Upon receiving the data from source system 113, monitoring module 103 compares each record (or subset of each record) with the corresponding previously stored copy in state database 104. If the value of at least a subset of a record is different, a change has been detected 310, and steps 903, 311, 312, and 313 are performed, as follows.

As mentioned previously, in at least one embodiment, comparison step 902 can include calculating a hash value for the data retrieved from source system 113, and comparing such hash value with previously stored hash value in state database 104. If a change in the hash value is detected, monitoring module 103 then examines and compares stored data values in state database 104 against data in source system 113, to determine, with specificity, which data item has changed.

When a change has been detected, the old and new values for each changed record are identified and stored 903, for example in event log database 114. In this manner, module 103 is able to keep a record of all relevant changes that have taken place to data in data store(s) 102. Furthermore, as described above, state database 104 is updated 311. Monitoring module 103 then makes a determination 312 as to whether the magnitude or degree of the change is sufficient to warrant notifying one or more user(s) 200, and if so, it initiates 313 a notification 111 to those client device(s) 110 associated with user(s) 200 who should be notified. As mentioned above, in at least one embodiment, determination 312 is made based on notification conditions 112 for each user 200.

Figure 10:
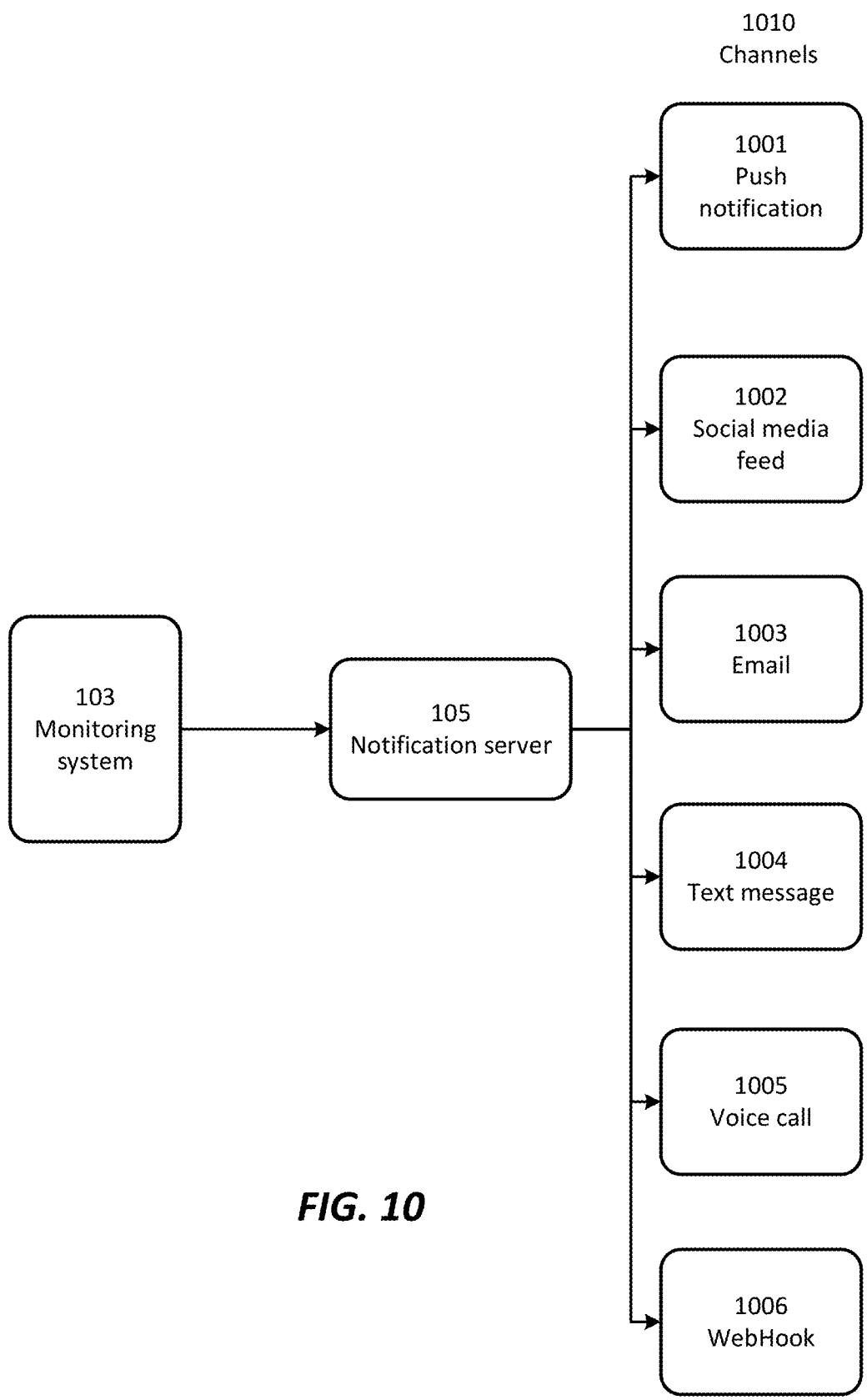
FIG. 10 is a block diagram depicting a relationship between a monitoring system, notification server, and various notification channels for alerting users as to changes to data values, according to one embodiment.

Any suitable mechanism can be used for notifying users 200 as to changes in data. Referring now to FIG. 10, there is shown a block diagram depicting a relationship between monitoring system 103, notification server 105, and various notification channels 1010 for alerting users 200 as to changes to data values, according to one embodiment. These channels include push notification 1001, social media feed 1002, email 1003, text message 1004, automated voice call 1005, and/or any other system via a protocol such as WebHook for sending a POST message to a website at a URL in response to an event.

The depicted channels 1010 are examples only; one skilled in the art will recognize that many different communication channels can be used for notifying users 200 as to changes in data.

The notifications themselves can take any suitable form, as long as such form is compatible with the particular channel used. In at least one embodiment, each notification can include a link to underlying data, allowing user 200 to obtain more details as to the context of the change in data values, and/or to gain visibility into additional data items that may relate to the changed data, and/or to interact with the underlying data.

User Interface Examples

Figure 4:
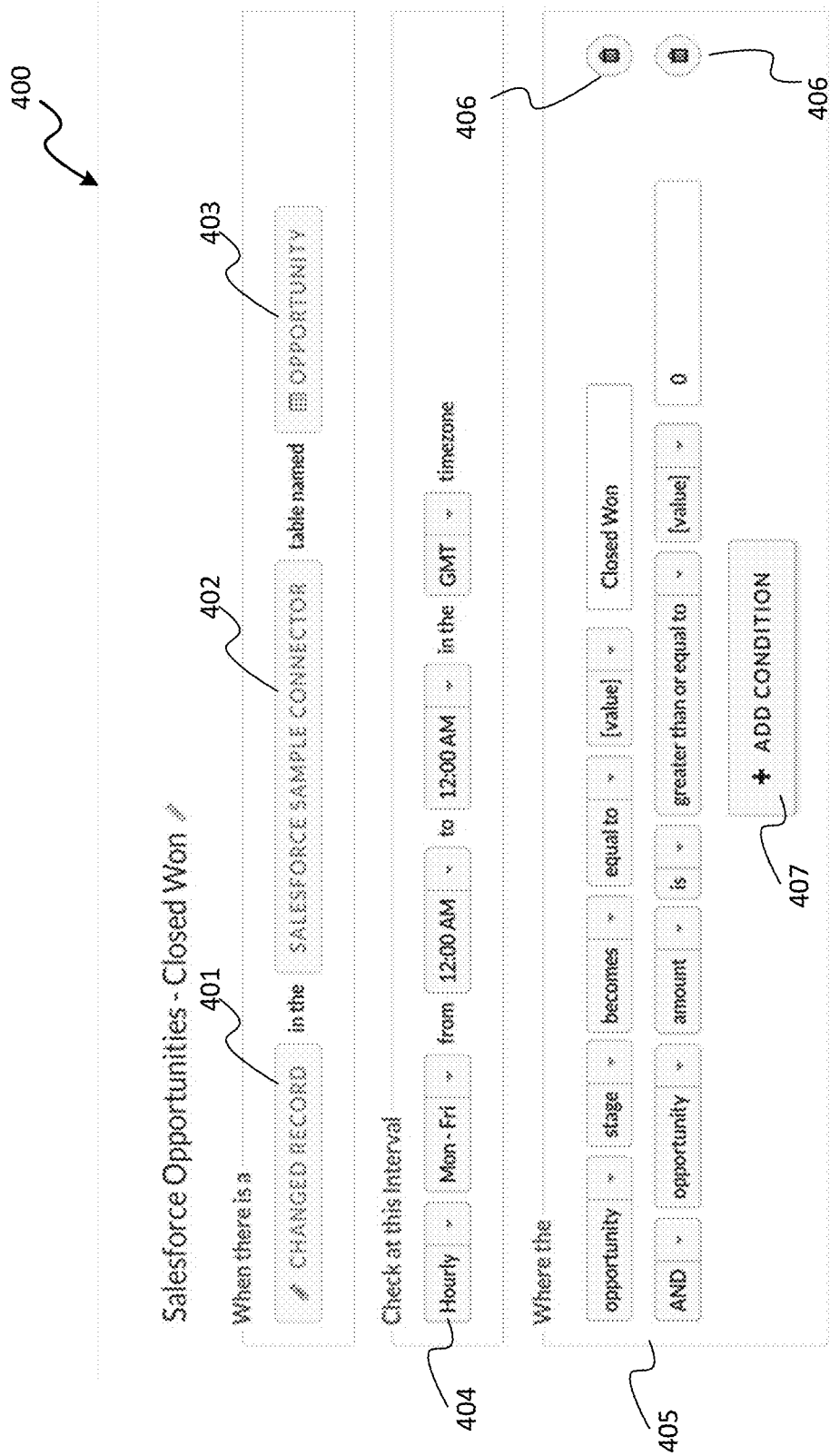
FIG. 4 is a screen shot depicting an example of entry of a condition for notifying a user as to a change in a data value, according to one embodiment.

Referring to FIG. 4, there is shown a screen shot 400 depicting an example of entry of a condition for notifying a user 200 as to a change in a data value, according to one embodiment. Screen shot 400 may be displayed, for example, during step 304 in which users 200 subscribe to notifications, or in which a system administrator specifies which end users should receive which notifications. Specifically, screen shot 400 depicts one example of an interface by which the system administrator (or other user 200) can specify conditions that will trigger a notification to be sent. Such interface may be presented via a web page, software applications, or other means. In at least one embodiment, such interface may be displayed on display 203 of client device 110, and the system administrator (or other user 200) may interact with the interface using any suitable input device 202. The various elements of the interface may include text fields, buttons, links, pop-up menus, and/or any other suitable input elements. Such controls can enable the system administrator (or other user 200) to specify a SQL-type query on data in source system 113, including conditions such as equal to, greater than, less than, and the like. In at least one embodiment, the system allows system administrators (or other users 200) to specify notification triggers upon detection of a data value satisfying a certain condition that was not previous satisfied; thus, a notification 111 is issued at such time at which the condition first became true.

Element 401 allows a system administrator (or other user 200) to specify the type of change that should result in a notification; examples include a changed record, a deleted record, an added record, and the like. In at least one embodiment, an end user can specify which types of information they are interested in, and an administrator uses the user interface of the system to specify the type of changes to data that should result in a notification. In at least one embodiment, end users can then tailor the rules to make additional adjustments to the notifications. Element 402 allows user 200 to specify the type of database table being monitored for changes. Element 403 allows user 200 to specify the particular table to be monitored.

Element 404 allows user 200 to specify the polling interval and time period. As shown in the example, a set of pop-up menus can be provided for specifying these parameters, although other user interface techniques can be used.

Element 405 allows user 200 to specify notification conditions. Again, the input mechanism can be a set of pop-up menus as shown in the example; alternatively, other techniques can be used. Notification conditions can include specifying target values and/or inequalities for particular variables. Any number of conditions can be specified, connected by operators such as AND, OR, X-OR, NOR, and/or the like. User 200 can click on button 407 to add a new condition, and can click on one of buttons 406 to delete a displayed condition.

Figure 5A:
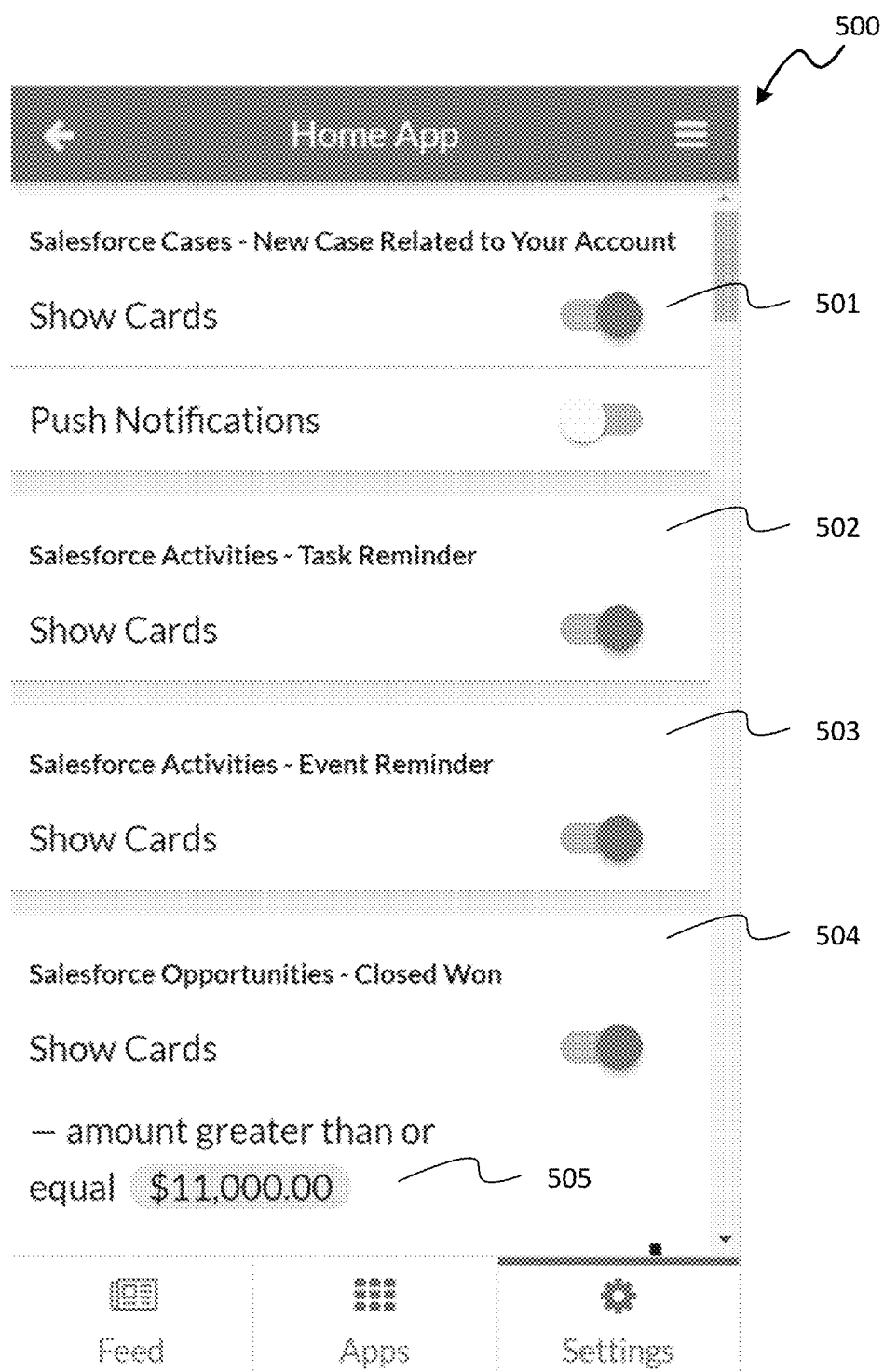
FIG. 5A is a screen shot depicting an example of a display screen for specifying notification preferences, according to one embodiment.

Referring now to FIG. 5A, there is shown a screen shot 500 depicting an example of a screen for specifying notification preferences, according to one embodiment. Screen shot 500 may be displayed, for example, when user 200 wishes to change preferences or settings for an app for receiving notifications via a smartphone or similar device.

Various sliders and controls can be provided for specifying various preferences. Screen shot 500 merely shows some illustrative examples, including:

New case display preferences 501, allowing user 200 to specify whether cards should be displayed for new cases related to user's 200 account, and whether push notifications should be transmitted when a new case is initiated;

Activities task reminder preferences 502, allowing user 200 to specify whether cards should be displayed to remind user 200 of tasks related to activities;

Activities event reminder preferences 503, allowing user 200 to specify whether cards should be displayed to remind user 200 of events related to activities;

Closed opportunities display preferences 504, allowing user 200 to specify whether cards should be displayed to notify user 200 when an opportunity has closed (i.e., a sale has been made); in at least one embodiment, a minimum amount for the opportunity can be specified (opportunities below the threshold do not result in automatic notifications).

One skilled in the art will recognize that other preferences and/or settings can be provided.

In at least one embodiment, different thresholds can be specified for different communication/notification channels. For example, the system can be configured to send a push notification if a value changes by at least a threshold amount, whereas a different (e.g., non-push) communication channel (such as a feed that user 200 can check at his or her leisure) is used for changes that are less than the threshold amount.

Figure 6A:
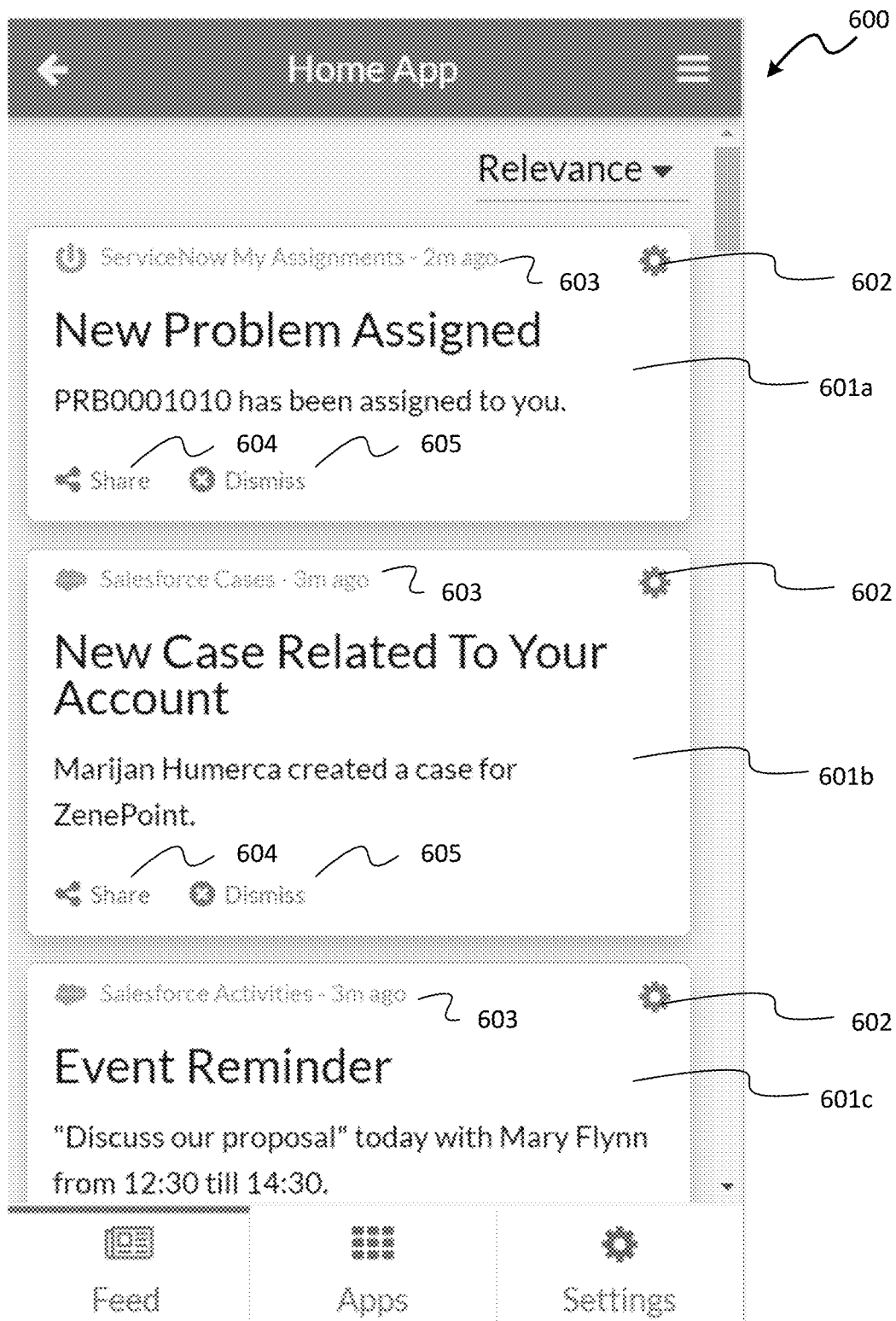
FIG. 6A is a screen shot depicting examples of notifications provided as cards on a display screen, according to one embodiment.

Referring now to FIG. 6A, there is shown a screen shot 600 depicting examples of notifications provided as cards 601 on a display screen, according to one embodiment. Screen shot 600 may be displayed, for example, on display 203 of client device 110 when a notification 111 is to be presented to user 200. However, one skilled in the art will recognize that notifications 111 can take other forms.

In the example, each card 601 specifies the event that triggered the notification 111, as well as additional information, an indication 603 of when the event occurred, a share button 604 allowing user 200 to share notification 111 with someone else, and a dismiss button 605 that causes the card 601 to be dismissed. In the example, card 601*a* relates to a new problem that has been assigned to user 200; card 601*b* provides notification that a new case related to user's 200 account has been created; and card 601*c* is a reminder of an upcoming event.

In at least one embodiment, when a notification 111 is presented to user 200, user 200 is given an opportunity to fine-tune the notification conditions, for example by editing settings or preferences to increase or decrease the notification trigger threshold, or to change the polling interval, or to make any other desired changes. In at least one embodiment, this is accomplished by presenting a screen such as the notification preferences screen depicted in FIG. 4, and receiving input from user 200 via such a screen to edit current notification settings. In at least one embodiment, such revised notification settings take place immediately for all future notifications.

Figure 5B:
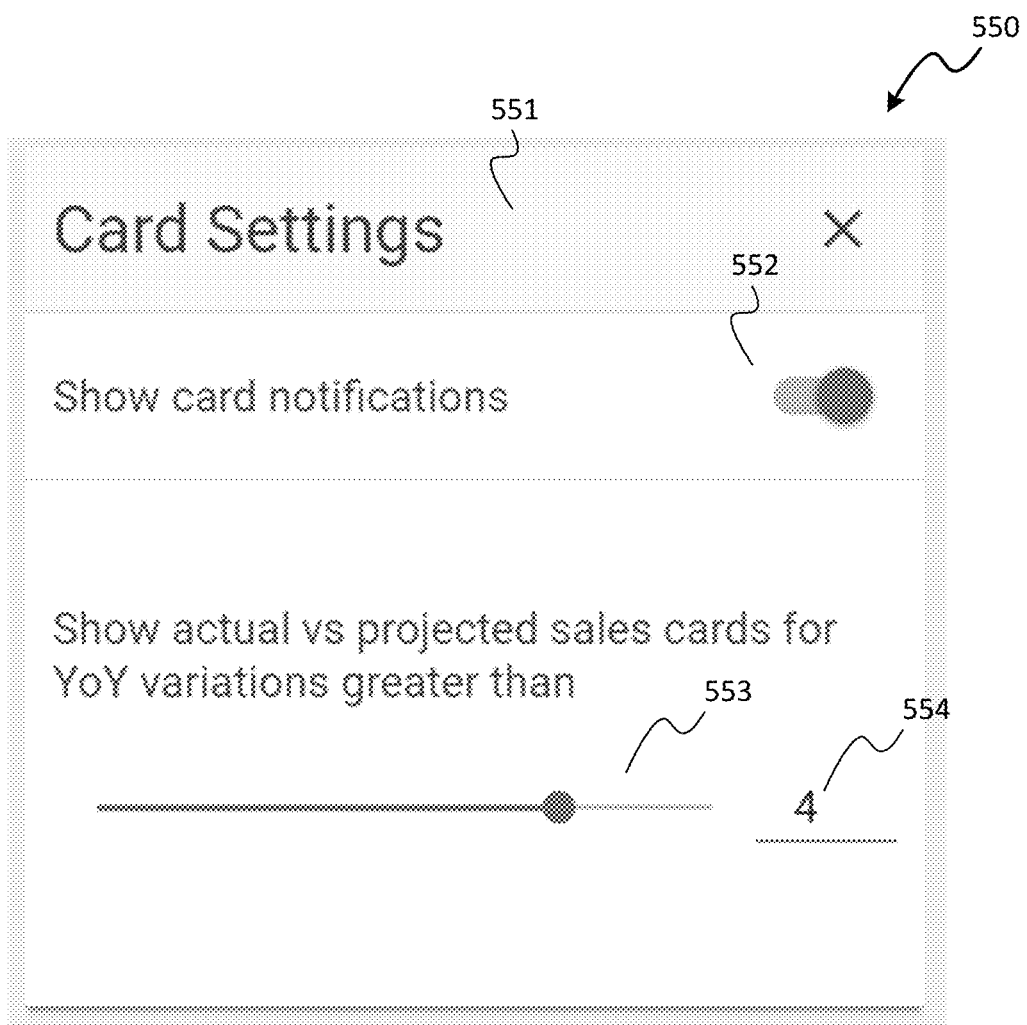
FIG. 5B is a screen shot depicting an example of a panel for adjusting card settings, according to one embodiment.

Referring now to FIG. 5B, there is shown a screen shot 550 depicting an example of a panel 551 for adjusting card settings, according to one embodiment, to allow an end user to fine-tune notification conditions, by, for example, using control 552 to specify whether card notifications should be shown, and by using slider 553 to specify under what conditions to show actual vs. projected sales cards (a numeric value 554 is also shown).

Figure 6B:
FIG. 6B is a screen shot depicting an example of graphical display of sales data, displayed in response to a trigger event, according to one embodiment.

Referring now to FIG. 6B, there is shown a screen shot 650 depicting an example 651 of graphical display of sales data, displayed in response to a trigger event, according to one embodiment. In at least one embodiment, example 651 might be depicted when, for example, the difference between projected data and actual data exceeds a certain threshold. Link 652 provides access to panel 551 for adjusting card settings, as described above.

In at least one embodiment, initial notification settings can be configured by an administrator, supervisor, or other individual. End users 200 can then fine-tune or personalize their notification settings to their particular needs and preferences. Again, a notification preferences screen as depicted in FIG. 4 can be used for such fine-tuning of notification settings.

In at least one embodiment, such personalization of notification preferences can be provided at the organization level, group level, individual user level, or any combination thereof. In at least one embodiment, users 200 can specify that different conditions result in different types of notifications; for example, minor changes can be ignored, moderate changes can use a first notification channel, and more significant changes can use a second notification channel that may be more intrusive or may be designed to attract more attention.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method comprising:
   receiving, by one or more processors, identification of one or more data items of interest to a user;
   establishing, by the one or more processors, one or more rules for monitoring at least one or more fields in one or more data sources corresponding to the one or more data items;
   executing, by the one or more processors based at least on the one or more rules, a first query against the one or more data sources;
   storing, by the one or more processors responsive to the first query, a first value of the one or more data items to a data store separate from the one or more data sources;
   monitoring, by the one or more processors using one or more queries based at least on the one or more rules, at least one data item of the one or more data items in the one or more data sources for a change in the first value;
   detecting, by the one or more processors responsive to monitoring, the change in the first value of the at least one data item of the one or more data items in the one or more data sources;
   storing, by the one or more processors responsive to the detection, the first value of the at least one data item in the data store prior to the change;
   updating, by the one or more processors, the first value of the at least one data item in the data store to a second value while maintaining the first value of the at least one data item in the data store prior to the change; and
   communicating, by the one or more processors responsive to the change in the first value of the at least one data item, a notification to a device of the user responsive to a notification setting of the user.

2. The method of claim 1, further comprising receiving, by the one or more processors, the notification setting, the notification setting identifying the one or more data items of interest to the user.

3. The method of claim 1, further comprising identifying, by the one or more processors, the one or more data items of interest to the user based one or more of the following; behavior of the user, a position of the user, data items of interests of other users similar to the user.

4. The method of claim 1, further comprising defining, by the one or more processors, the one or more rules for monitoring one or more records in the one or more data items, the one or more records comprising the at least one or more fields.

5. The method of claim 1, further comprising determining, by the one or more processors, the change in the first value meets a notification condition of the notification setting of the user.

6. The method of claim 4, further comprising communicating, by the one or more processors, the notification responsive to the determination.

7. The method of claim 1, further comprising communicating, by the one or more processors, the notification via one or more of the following: a push notification, an alert within an application, a text message, an instant message, an email message, an alert on a website or a voice call.

8. A system comprising:
one or more processors, coupled to memory and configured to:
receive identification of one or more data items of interest to a user;
establish one or more rules for monitoring at least one or more fields in one or more data sources corresponding to the one or more data items;
execute, based at least on the one or more rules, a first query against the one or more data sources;
store, responsive to the first query, a first value of the one or more data items to a data store separate from the one or more data sources;
monitor, using one or more queries based at least on the one or more rules, at least one data item of the one or more data items in the one or more data sources for a change in the first value;
detect, responsive to monitoring, the change in the first value of the at least one data item of the one or more data items in the one or more data sources;
store, responsive to the detection, the first value of the at least one data item in the data store prior to the change;
update, the first value of the at least one data item in the data store to a second value while maintaining the first value of the at least one data item in the data store prior to the change; and
communicate, responsive to the change in the first value of the at least one data item, a notification to a device of the user responsive to a notification setting of the user.

9. The system of claim 8, wherein the one or more processors are further configured to receive the notification setting, the notification setting identifying the one or more data items of interest to the user.

10. The system of claim 8, wherein the one or more processors are further configured to identify, the one or more data items of interest to the user based one or more of the following: behavior of the user, a position of the user, data items of interests of other users similar to the user.

11. The system of claim 8, wherein the one or more processors are further configured to define the one or more rules for monitoring one or more records in the one or more data items, the one or more records comprising the at least one or more fields.

12. The system of claim 8, wherein the one or more processors are further configured to determine the change in the first value meets a notification condition of the notification setting of the user.

13. The system of claim 12, wherein the one or more processors are further configured to communicate the notification responsive to the determination.

14. The system of claim 8, wherein the notification comprises one or more of the following: a push notification, an alert within an application, a text message, an instant message, an email message, an alert on a web site or a voice call.

15. A non-transitory computer-readable medium, comprising instructions that, when executed by one or more processors of a device, cause the one or more processors to:
receive identification of one or more data items of interest to a user;
establish one or more rules for monitoring at least one or more fields in one or more data sources corresponding to the one or more data items;
execute, based at least on the one or more rules, a first query against the one or more data sources;
store, responsive to the first query, a first value of the one or more data items to a data store separate from the one or more data sources;
monitor, using one or more queries based at least on the one or more rules, at least one data item of the one or more data items in the one or more data sources for a change in the first value;
detect, responsive to monitoring, the change in the first value of the at least one data item of the one or more data items in the one or more data sources;
store, responsive to the detection, the first value of the at least one data item in the data store prior to the change;
update, the first value of the at least one data item in the data store to a second value while maintaining the first value of the at least one data item in the data store prior to the change; and
communicate, responsive to the change in the first value of the at least one data item, a notification to a device of the user responsive to a notification setting of the user.

16. The computer-readable medium of claim 15, further comprising instructions that cause the one or more processors to receive the notification setting, the notification setting identifying the one or more data items of interest to the user.

17. The computer-readable medium of claim 15, further comprising instructions that cause the one or more processors to identify, the one or more data items of interest to the user based one or more of the following: behavior of the user, a position of the user, data items of interests of other users similar to the user.

18. The computer-readable medium of claim 15, further comprising instructions that cause the one or more processors to define the one or more rules for monitoring one or more records in the one or more data items, the one or more records comprising the at least one or more fields.

19. The computer-readable medium of claim 15, further comprising instructions that cause the one or more processors to determine the change in the first value meets a notification condition of the notification setting of the user.

20. The computer-readable medium of claim 19, further comprising instructions that cause the one or more processors to communicate the notification responsive to the determination.

* * * * *